Sept. 13, 1949. S. S. KING 2,481,846
POSITION COMPUTER
Filed June 1, 1945

Inventor,
SIDNEY S. KING JR.
By Semmes Keegin Beale & Semmes
Attys.

Patented Sept. 13, 1949

2,481,846

UNITED STATES PATENT OFFICE 2,481,846

POSITION COMPUTER

Sidney S. King, Yellow Springs, Ohio

Application June 1, 1945, Serial No. 597,091

6 Claims. (Cl. 235—83)

This invention relates to computers and more particularly to a computer for quickly and accurately determining the geographical position of a moving body, such as an airplane, from data indicated on instruments carried by the airplane. In view of the increased use of airplanes, particularly under instrument flight conditions, the accurate and rapid interpretation of certain aircraft radio equipment becomes increasingly important. Because of the mathematical computations required to interpret the instruments in the aircraft, the pilot often requires a relatively large interval of time to complete the computations and finds that the aircraft has flown an undesirably long distance over the ground with a resultant error in the calculations. The present invention deals with a computer to quickly and accurately arrive at the desired interpretation.

In this connection, one of the instruments with which a pilot is concerned in navigating an aircraft is the magnetic compass, the use of which determines the direction the aircraft is traveling. In navigation, the operator is primarily concerned with two of the errors to which this instrument is subject, magnetic deviation, and magnetic variation.

The first of these errors, magnetic deviation, is the attraction of the compass to magnetic fields other than the magnetic north pole, such as the engines of the aircraft or fields set-up by electrical equipment in the aircraft. Partial compensation for this error can be accomplished by rotating two magnets installed as part of the standard compass equipment, but it is necessary to mount a card next to the compass showing the number of degrees the compass is pulled from the actual magnetic heading at regularly spaced intervals around the compass rose. This error is commonly known as deviation, and the figure on the deviation card must be added or subtracted, as indicated for the heading flown, to determine the actual magnetic heading of the aircraft.

The other error of the magnetic compass, with which this invention is concerned, is known as magnetic variation. The geographical location of the magnetic north differs from the true north pole and, unless the aircraft, the magnetic north, and the north pole are aligned in a straight course, the variation error is introduced into the reading of the compass. This variation is the angle formed by two theoretical lines extending from the compass to the north pole and the magnetic north, but a variance will be shown in certain localities of the world where terrain features and mineral deposits cause a disturbance in the magnetic field of the magnetic north. The variation for most localities of the world is well known, and aircraft maps include lines showing the easterly or westerly variation of magnetic north from true north. To arrive at the true heading of the aircraft in relation to the north pole, this variation must be added to the magnetic heading if the variation is easterly, and subtracted if the variation is westerly.

The other aircraft instrument with which this invention is concerned is the radio compass. This is a radio receiver in common use in both civilian and military aircraft, the use of which will determine the direction of a specific radio station from the aircraft. The instrument used to determine this direction consists of a dial mounted on the instrument panel of the airplane on which is printed a compass rose reading from 0° to 360° calibrated clockwise, with the 0° mark at the top center of the dial. An indicator needle, pivoted at the center of the dial, will rotate to a point on the dial when the receiver is tuned to a radio station. The figure at which this indicator stops is known as the relative bearing and is actually the relation of the nose of the airplane to the radio station expressed in degrees, or the number of degrees the airplane would have to turn to the right to be headed directly at the station.

In flight, it is often desirable and necessary for the pilot to tune in two or more stations in rapid succession and make a computation for each station tuned to, based on the readings of the two instruments described above. The result of each computation is then plotted on a map and the geographical location of the airplane is then fixed. For example, a theoretical computation would be as follows: The desired result is the reciprocal of the true bearing from the airplane to the station, and can be expressed in the formula, $$(CH \pm D \pm V) + RB - 180 = RTB$$

where:

CH—compass heading
D—deviation
V—variation
RB—relative bearing
RTB—reciprocal true bearing or; if the sum of $(CH \pm D \pm V) + RB$ is more than 360, the formula is expressed as:

$$(CH \pm D \pm V) + RB - 540 = RTB$$

If:

CH is 317°
D is —3°
V is 14° easterly
RB is 232° we can substitute these theoretical values in the formula and get:

$$(317° - 3° + 14°) + 232° - 540 = RTB$$
$$328° + 232° - 540 = RTB$$
$$560° - 540 = 20°$$

We know now that the aircraft is located at some point on a line from the station drawn on the map as a true bearing of 20°. This computation is repeated for each station to be used, the lines are plotted on a map, and the position of the aircraft is indicated by the point where the lines form a small triangle. Accuracy of the result is increased by maintaining the least practical interval of time between the beginning of the process and the final plotting of the lines because of the continuous forward movement of the airplane.

Therefore, the problem of location in flight by bearing interception involves the computation of the bearings from two or more radio stations to an airplane, the lines being drawn along determined bearings so that they intersect at a point, or triangle, said point or triangle thereby determining the location of the airplane. For a general discussion of the problem involved, reference may be made to pages 114, 115, 134 and 135 of "Practical Air Navigation" by Thoburn C. Lyon, Civil Aeronautics Bulletin No. 24 (September, 1940).

Another problem of navigation to be solved, after the geographical position of the airplane has been fixed, is the determination of what the relative bearing will be when the airplane, flying a predetermined heading, intercepts a predetermined bearing on a specific radio station. By use of an aircraft map, the magnetic heading to be flown between two points can be determined and the magnetic bearing from the point of destination to a radio station in the vicinity can be calculated. To determine what the relative bearing of the radio compass will be, when the destination is reached, the pilot is expected to make a mental calculation of the angle of interception from the heading of the airplane and the bearing to be intercepted. This angle is the number of degrees the airplane must be turned to fly parallel to the desired bearing, and this should be figured on either the inbound or outbound bearings, whichever gives an angle of less than 90°. If the angle of interception is based on the inbound bearing, the relative bearing, at the moment of interception, is the same number of degrees to the right or left of 0° on the radio compass dial. This direction is determined by whether the station is to the right or left of the nose of the airplane. If the angle of interception is based on the outbound bearing, the relative bearing, at the moment of interception, is the same number of degrees to the right or left of 180° on the radio compass dial. This direction is determined by whether the station is to the right or left of the tail of the airplane. This problem is expressed by the formula:

$$PB - MH = RB$$

where:

PB is predetermined bearing
MH is magnetic heading
RB is relative bearing but, if PB is smaller than MH, the formula then becomes:

$$(PB + 360°) - MH = RB$$

For example, we can substitute therortical figures as follows:

$$(55° + 360°) - 190° = RB$$
$$415° - 190° = 225°$$

In calculating this by the angle-of-interception method described above, it is found that the aircraft is intercepting an inbound bearing of 55° while flying a heading of 190°. Since the aircraft is outbound from the station, the reciprocal of 55°, or 235° should be used to keep the angle less than 90°. In subtracting 190° from 235°, it is found that the angle of interception is 45°. The station will be to the left of the tail of the airplane, so 45° is added to 180°, and the relative bearing of 225° is arrived at.

When flying on instruments, it is often desirable and necessary, when using a non-directional radio station, to make what is known as a boxing procedure when letting down to make contact with the ground so that a safe landing can be accomplished. In this procedure, it is necessary to know the magnetic bearing from the radio station to the landing field. There are numerous procedures to be followed in the box, but it is always necessary for the pilot to know the station to field bearing, its reciprocal, and the two bearings perpendicular to the station-to-field bearing. These are the four headings that are used in flying the boxing procedure.

It will be appreciated that the procedures that have been previously described necessarily require an undesirable length of time with a resulting error in calculation due to continued flight.

One of the objects of the present invention is to provide a computer by means of which the desired information, as to geographical position, can be quickly and accurately determined by interpretation of readings provided by aircraft equipment, and information secured from aircraft maps.

Another object of the present invention is to provide a computer by means of which the radio station to airplane bearing and the inbound bearing of station-to-plane can be quickly and accurately determined from readings provided by aircraft equipment.

Still another object of the present invention is to provide a computer of the type described by means of which the point of bearing interception can be rapidly and accurately determined.

A further object of the present invention is to provide a computer of the type described by means of which all of the headings to be used in a boxing procedure can be simultaneously determined with rapidity and accuracy.

With these and other objects in view, which may be incident to my improvements, the present invention consists in the procedural steps, parts and combinations hereinafter set forth and claimed, with the understanding that the necessary elements comprising the invention and the procedural steps of its operation may be varied by those skilled in the art without departing from the spirit of the invention.

In order to make the invention more clearly understood, reference is made to the accompanying drawings which are for the purpose of illustrating a preferred means for carrying the invention into practical effect.

Figure 1:
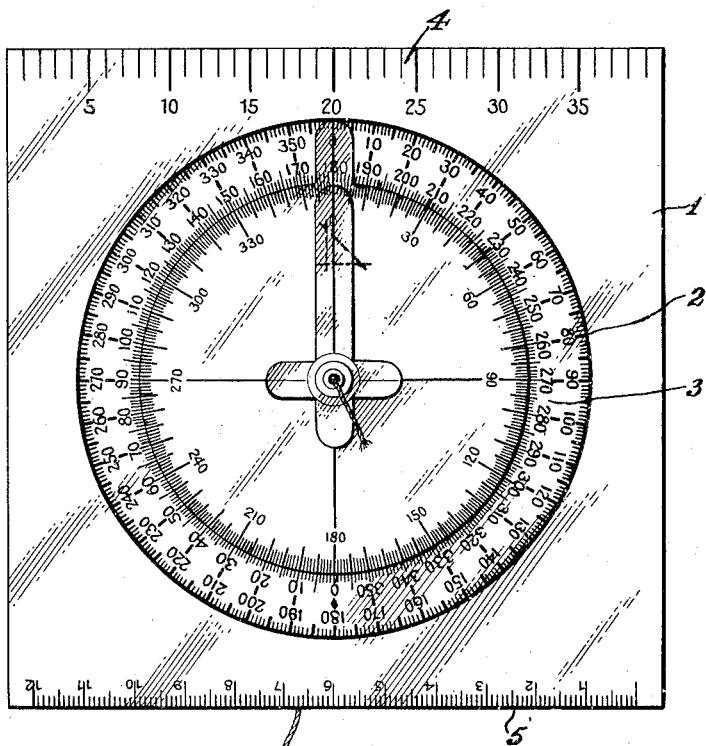
Figure 1 is a plan view of a computer embodying the present invention.
Figure 2:
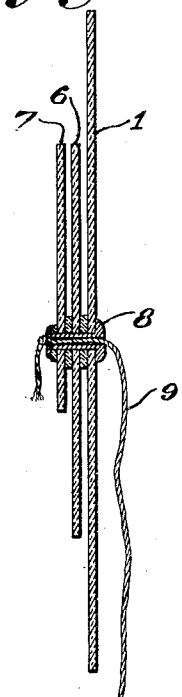
Figure 2 is a transverse sectional view of the computer shown in Figure 1.
Figure 3:
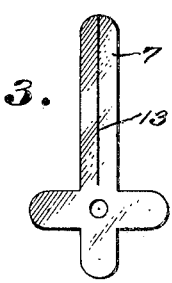
Figure 3 is a plan view of the pointer included in the previously described figures of the drawings.
Figure 4:
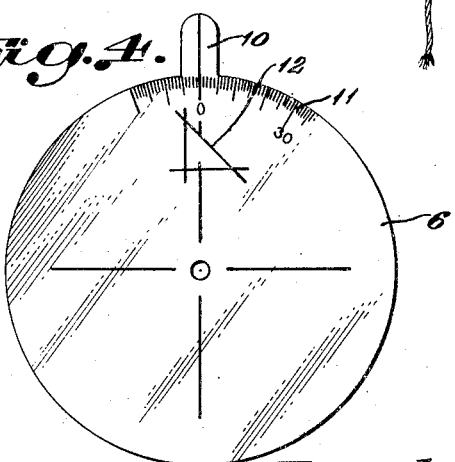
Figure 4 is a plan view of the circular disc included in Figures 1 and 2.

The computer shown in the drawings for solving the previously described problems comprises several transparent members which are rotatably mounted on a base plate 1. Preferably these members are made of a plastic material although other transparent materials may be employed if desired.

The base plate 1 is preferably a square piece of clear plastic material on which is printed a compass rose 2 reading clockwise from 0° to 360° and a diametrically smaller compass rose 3 reading clockwise from 0° to 360°. The smaller rose 3 is concentric with respect to the larger rose 2, and is registered in such a manner that precisely opposed markings on the concentric circles are 180° different. On the top edge of the square, above the 0° mark on the larger compass rose, is printed a 1:500,000 mileage scale 4 for measuring miles on an aircraft sectional map, and on the bottom edge is printed a 1:1,000,000 mileage scale 5 for measuring miles on an aircraft regional map.

Centrally mounted on the base plate 1 is a disc 6 and a pointer 7. These parts are mounted for rotation on a tubular rivet 8 through which is fastened a string 9. The diameter of the disc 6 is the same as the inside diameter of the smaller compass rose 3 printed on the base plate 1. This disc has an extension 10 at one point on the perimeter of the circle with a radius, measured from the center of the circle, equal to the radius of the larger compass rose 2 on the base plate 1. Printed on this piece is a 360° compass rose 11 with the degree markings running to the outer edge, and reading clockwise. The 0° mark is precisely at the center of the extension 10 of the circle and continues to the end of the extension in such a manner that it will register on top of the degree indications of the compass roses 2 and 3 of the square plate or "fixed azimuth." Also printed on this disc 6 are lines radiating from the center of the disc 6 to the 0°, 90°, 180° and 270° indications on the rose 11. The line to 0° is interrupted for the inclusion of a triangular marking 12, representing an airport.

The pointer 7 has paralleled sides and an indicator line 13 running the length of the pointer equidistant between the sides. In assembly, this pointer will extend to the perimeter of the round, rotatable disc 6. The theoretical problem in which we had the following values can be solved by the computer in this manner.

Compass heading is 317°
Deviation is —3°
Variation is 14° easterly
Relative bearing is 232°

Place the indicator line of the extension 10 of the rotatable azimuth 6 over 317° on the outer compass rose 2 of the fixed azimuth 1. Rotate the indicator 3° counter-clockwise to compensate for deviation. Rotate the indicator 14° clockwise to compensate for variation. The indicator line now rests directly above the true heading of the aircraft. Place the pointer 7 at 232° on the scale 11 of the rotatable disc 6. Opposite this pointer will be found the figures 200° on the outer scale 2 and 20° on the inner scale 3. We now know that 200° is the true inbound bearing from airplane to station, and 20° is the true reciprocal or station-to-plane bearing.

This bearing can now be plotted by holding the string 9 over the radio station on the map and swinging the computer 1 until the string is directly under the 200° mark on the fixed azimuth when the edges of the computer 1 are parallel with the meridians of the map. The path on the map indicated by the string 9 is the path over the ground from the station to the airplane.

The theoretical problem of bearing interception is solved by placing the indicator 10 of the rotatable azimuth over the magnetic heading of the airplane as represented on the outer scale 2 of the fixed azimuth. The pointer 7 is then placed opposite the predetermined bearing, inbound or outbound, as represented by the outer 2 and inner scales 3 respectively on the fixed azimuth. Under the line of the pointer 7 is now read the relative bearing to be indicated at the moment of interception.

The determination of the headings to be used in a boxing procedure is accomplished by placing the indicator 10 of the rotatable azimuth over the sation-to-field bearing as represented on the outer scale 2 of the fixed azimuth. The other headings to be flown in the box are read on this same scale opposite the lines radiating from the center of the rotatable azimuth. The radio station can be assumed to be located at the center of the computer 1 and the field is represented by the triangular mark 12 on the rotatable azimuth 6.

It will be appreciated from the foregoing that a computer embodying the present invention can be employed to rapidly and accurately determine the position of an airplane in flight. It is also of value in instruction by giving visual indications of the problems involved.

I claim:

1. A computer for determining the geographical position of an airplane from data indicated on aeronautical charts and on instruments carried by the airplane comprising, a base plate on which appear two compass roses concentrically positioned with respect to one another, the larger rose reading clockwise from 0 to 360° and the smaller rose reading clockwise from 0 to 360°, the two roses being registered in such manner that associated markings have a difference of 180°, a disc mounted concentrically with said compass roses for rotation on said base plate the diameter of said disc being equal to the diameter of the previously mentioned smaller compass rose, an extension of the periphery of said disc of sufficient length to increase the radius of the disc to equal the radius of the said larger compass rose, a 360° compass rose with degree markings running to the periphery of the disc, said rose reading clockwise and the 0° mark being precisely in the center of the projection forming the extension of the disc, the marking lines of 0°, 90°, 180° and 270° radiating from the center of the disc to the perimeter, the 0° line being interrupted by the inclusion of a mark representing an airport, a pointer positioned on the disc, said pointer extending to the perimeter of the said disc and having an axial line running the length of the pointer, means to mount the disc and pointer for independent rotation on the base plate and a string extending through the said means.

2. A computer for determining bearings from an airplane to a radio station and a radio station to an airplane from data indicated on instruments carried by the airplane comprising, a rectangularly shaped base plate on which appear two compass roses concentrically positioned with respect to one another, the larger rose reading clockwise from 0 to 360° and the smaller rose reading clockwise from 0 to 360°, the two roses being registered in such manner that associated markings have a difference of 180°, a disc mounted concentrically with said compass roses for rotation on said base plate the diameter of said disc being equal to the inside diameter of the previously mentioned smaller compass rose, an extension of the periphery of said disc of sufficient length to increase the radius of the disc to equal the radius of the said larger compass rose, a 360° compass rose with degree markings running to the periphery of the disc, said rose reading clockwise and the 0° mark being precisely in the center of the projection forming the extension of the disc, the marking lines of 0°, 90°, 180° and 270° radiating from the center of the disc to the perimeter, the 0° line being interrupted by the inclusion of a mark representing an airport, a pointer positioned on the disc, said pointer extending toward the perimeter of the said disc, and means to mount the disc and pointer for independent rotation on the base plate.

3. A computer for determining the point of bearing interception from data indicated on aeronautical charts and on instruments carried by the airplane comprising, a base plate on which appear two compass roses concentrically positioned with respect to one another, the larger rose reading clockwise from 0 to 360° and the smaller rose reading clockwise from 0 to 360°, the two roses being registered in such manner that associated markings have a difference of 180°, a disc mounted concentrically with said compass roses for rotation on said base plate the diameter of said disc being equal to the inside diameter of the previously mentioned smaller compass rose, an extension of the periphery of said disc of sufficient length to increase the radius of the disc to equal the radius of the said larger compass rose, a 360° compass rose with degree markings running to the periphery of the disc, said rose reading clockwise and the 0° mark being precisely in the center of the projection forming the extension of the disc, the marking lines of 0°, 90°, 180° and 270° radiating from the center of the disc to the perimeter, the 0° line being interrupted by the inclusion of a triangular marking representing an airport, a pointer positioned on the disc, said pointer extending to the perimeter of the said disc and having an axial line running the length of the pointer, means for mounting the disc and pointer for independent rotation on the base plate and a string connected to said means.

4. A computer for determining the headings to be flown in a boxing procedure from data indicated on aeronautical charts and on instruments carried by the airplane comprising, a base plate on which appear two compass roses concentrically positioned with respect to one another, the larger rose reading clockwise from 0 to 360° and the smaller rose reading clockwise from 0 to 360°, the two roses being registered in such manner that associated markings have a difference of 180°, a disc mounted concentrically with said compass roses for rotation on said base plate the diameter of said disc being equal to the inside diameter of the previously mentioned smaller compass rose, an extension of the periphery of said disc of sufficient length to increase the radius of the disc to equal the radius of the said larger compass rose, a 360° compass rose with degree markings running to the periphery of the disc, said rose reading clockwise and the 0° mark being precisely in the center of the projection forming the extension of the disc, the marking lines of 0°, 90°, 180° and 270° radiating from the center of the disc to the perimeter, the 0° line being interrupted by the inclusion of a mark representing an airport, a pointer positioned on the disc, said pointer extending to the perimeter of the said disc and having an axial line running the length of the pointer and means to mount the disc and pointer for independent rotation on the base plate.

5. A computer for determining geographical position from data indicated on navigational charts and upon instruments comprising a base plate on which appear two compass roses concentrically positioned with respect to one another, the two roses reading in the same direction from 0 to 360° and being registered in such a manner that associated markings have a difference of 180°, a disc mounted concentrically with said compass roses for rotation on said base plate, the diameter of the disc being approximately equal to the diameter of the smaller of the said concentrically positioned roses, an extension of the periphery of said disc of sufficient length to identify markings on the larger rose, a 360° compass rose on the said disc, said compass rose reading in the same direction as the previously mentioned roses and the 0° mark being positioned at the center of the projection forming the extension of the disc, a pointer positioned on the disc, said pointer extending towards the perimeter of said disc, means to mount the disc and pointer for independent rotation on the base plate and a string extending through said means.

6. A computer for determining geographical position from data indicated on navigational charts and upon instruments comprising a base plate on which appear two compass roses concentrically positioned with respect to one another, the degree marking on each rose reading in the same direction and being registered in such a manner that associated markings have a difference of 180°, a disc mounted concentrically with said compass roses for rotation on said base plate, the diameter of the disc being approximately equal to the diameter of the smaller of the said concentrically positioned roses, an extension on the periphery of said disc of sufficient length to identify markings on the larger rose, a compass rose on said disc, said compass rose reading in the same direction as the markings on the previously mentioned roses and the 0 mark being positioned on the projection forming the extension of the disc, a pointer positioned above the disc, said pointer extending towards the perimeter of the disc, means to mount the disc and pointer for independent rotation on the base plate and a string attached at one end to said means.

SIDNEY S. KING.

REFERENCES CITED

The following references are of record in the file of this patent:

UNITED STATES PATENTS

| Number | Name | Date |
| --- | --- | --- |
| 1,104,844 | Sundell | July 28, 1914 |
| 2,007,986 | Sprague | July 16, 1935 |
| 2,329,274 | Lamoreaux | Sept. 14, 1943 |
| 2,345,020 | Warner | Mar. 28, 1944 |

OTHER REFERENCES

Pages 114, 115, 134 and 135 of "Practical Air Navigation" by Thoburn C. Lyon, Civil Aeronautics Bulletin No. 24 (September 1940). Copy on file in the Scientific Library of the Patent Office.